*INVENTOR.*
WALTHER BEHM
BY
*ATTORNEY*

July 8, 1952 W. BEHM 2,602,875
HEATING SYSTEM AND HEATING APPARATUS
Filed Nov. 1, 1948 5 Sheets-Sheet 3

INVENTOR.
WALTHER BEHM
BY
ATTORNEY

July 8, 1952  W. BEHM  2,602,875

HEATING SYSTEM AND HEATING APPARATUS

Filed Nov. 1, 1948  5 Sheets-Sheet 5

*INVENTOR.*
WALTHER BEHM
BY
ATTORNEY

Patented July 8, 1952

2,602,875

UNITED STATES PATENT OFFICE 2,602,875

HEATING SYSTEM AND HEATING APPARATUS

Walther Behm, New York, N. Y., assignor to Behm Laboratories, Inc., New York, N. Y.

Application November 1, 1948, Serial No. 57,688

16 Claims. (Cl. 219—38)

1

The present invention relates to a heating system and a heating apparatus.

An object of the present invention is to provide a heating system having a high efficiency.

A further object of the present invention is to provide a heating system wherein the starting period may be reduced to a minimum.

Another object of the present invention is to provide a heating system wherein the fluid is subject to a high degree of circulation during operation.

Still another object of the present invention is to provide a heating apparatus capable of producing a high degree of convection.

A further object of the present invention is to provide a radiator-boiler unit, which has a high efficiency in operation.

Another object of the present invention is to provide a radiator-boiler unit, which is light in weight and may be readily transported from one place to another.

Still another object of the present invention is to provide a heating apparatus which may be readily manufactured at low costs.

A further object of the present invention is to improve on heating systems and heating apparatus as now ordinarily made.

With the above and other objects of the invention in view, the invention consists in the novel system, construction, arrangement and combination of various devices, elements and parts, as set forth in the claims hereof, certain embodiments of the same being described in the specification and being illustrated in the accompanying drawings forming part of this specification, wherein:

Fig. 8 is a fragmentary side elevational view,

2 partly in section of another embodiment of a heating apparatus according to the invention, Fig. 9 is a fragmentary side elevational view, partly in section, of still another embodiment of a heating apparatus according to the invention, Fig. 10 is a vertical sectional view of an element which may be used for connecting the heating device of the apparatus shown in Fig. 9 with the upper portions of two separate parts of a radiator, Fig. 11 is a fragmentary side elevational view, partly in section, of another embodiment of a heating apparatus according to the invention, and Fig. 12 is a sectional view taken on line 12—12 of Fig. 11.

Figure 1:
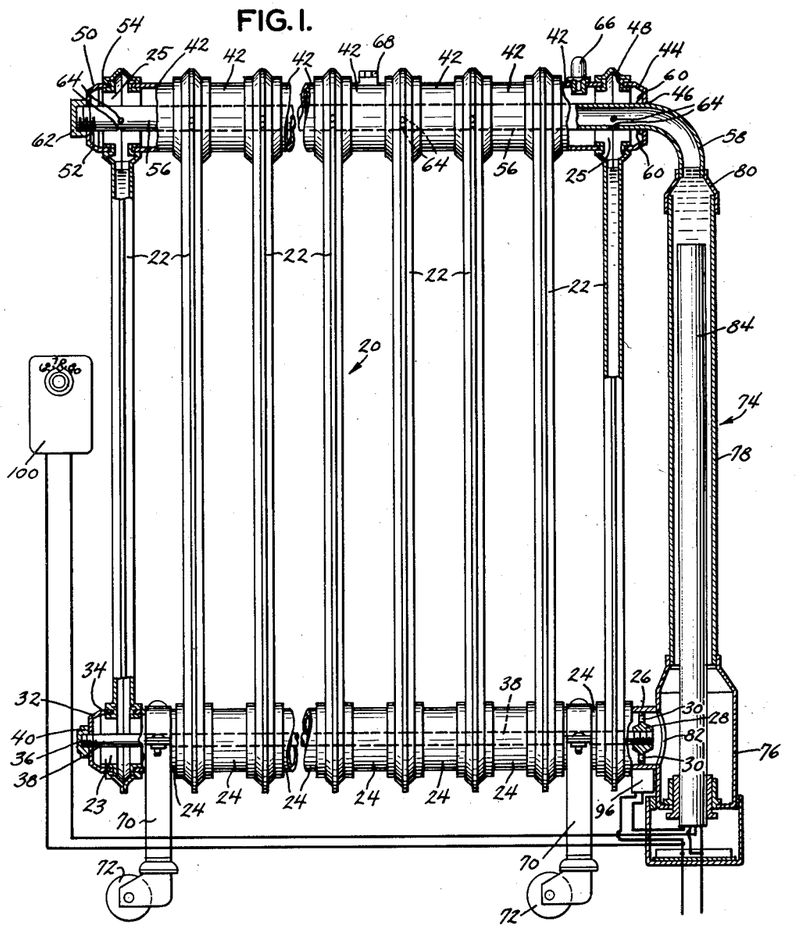
Fig. 1 is a side elevational view of a heating apparatus according to the invention, partly shown in section.

Referring now to Fig. 1, 20 generally indicates a radiator having a plurality of hollow upright sections 22. Each of said sections 22 has a passage 23 at its lower end portion and a passage 25 at its upper end portion, said passages extending from one side to the other of said sections 22.

The lower ends of said hollow sections are spaced from each other by a series of annular spacers 24, which are engaged with circular grooves arranged on the sections. An annular member 26 arranged at the right hand side of the lower portion of the right hand end section 22 and engaged with a circular groove thereof is provided with a socket 28 arranged in the interior of said annular member 26 and rigidly secured to the walls thereof. Said socket 28 is provided with a threaded center bore and has a series of passages 30. A closure cap 32 arranged at the left-hand side of the lower portion of the left-hand end section 22 is engaged with a groove 34 of said section 22. Said cap 32 is provided with a center bore 36. One end of a bracing rod 38 having a threaded end is screwed into the threaded center bore of the socket 28 at the right hand side of the lower portion of the radiator 20. The other end of said bracing rod 38, likewise provided with a threaded portion, passes through the center bore 36 of the closure cap 32. The lower end portions of the hollow sections 22 and the spacers 24 interposed between said sections 22 may be tightly held together by means of a nut 40 screwed on the projecting threaded portion of the bracing rod 38.

The upper end portions of the hollow sections 22 are spaced from each other by a series of annular spacers 42 engaged with circular grooves on said sections. A closure cap 44 having a center bore 46 is engaged with a groove 48 arranged at the right-hand side of the upper portion of the right-hand end section 22. Likewise, a closure cap 50 having a center bore 52 is engaged with a groove 54 arranged at the left-hand side of the upper portion of the left-hand end section 22. A conduit or pipe 56 extends within the upper portion of the radiator 20 and passes through the passages 25 of the upper portions of the sections 22 and the interior of the annular spacers 42. At the right-hand end of the radiator the conduit 56 engaged with the center bore 46 of the closure cap 44 projects from the radiator and has a downwardly bent end 58. The conduit 56 is rigidly secured to the closure cap 44 at 60, for example by welding. The left-hand end of the conduit 56 provided with a threaded portion passes through the center bore 52 of the closure cap 50. The upper portions of the hollow sections 22 and the spacers 42 arranged between same may be tightly held together by means of a threaded closure cap 62 threaded on the threaded end portion of the conduit 56. Said closure cap 62 closes also tightly the left-hand end of the conduit 56.

For a purpose to be described hereinafter, the conduit 56 is provided with a series of apertures 64, for example three apertures in each section 22 of the radiator 20. The apertures 64 of the conduits 56 in the various sections of the radiator 20 may be made of equal cross sections or may be made of varying cross sections; for example, the diameter of the apertures 64 may slightly increase from the right-hand end of the radiator (as viewed in Fig. 1) to the left-hand end of the radiator.

One of the spacers 42 in the upper portion of the radiator 20 is provided with a threaded opening for receiving a safety valve 66.

Another spacer 42 in the upper portion of the radiator is provided with a threaded bore which may be closed by a closing member 68. If said closing member 68 is removed, the apparatus may be filled with a liquid, for example water.

Brackets 70 carrying casters 72 are attached to the lower portion of the radiator 20, so that the radiator may be readily moved from one place to another.

A boiler generally indicated by 74 is attached to the radiator 20 so as to form a unit together with the latter. The boiler 74 comprises a heating chamber including a lower vessel 76, a tubular portion 78 and a tapered hollow top member 80 rigidly connected with each other. The lower vessel 76 rigidly connected with the member 26 forming a part of the boiler 74 has an inlet opening 82 communicating with the interior of said member 26 and the remaining parts of the lower portion of the radiator. The tapered top member 80 of the heating chamber of the boiler 74 has an outlet opening communicating with the downwardly bent end 58 of the conduit 56 to which the top member 80 is rigidly secured.

An electric heating device 84 extends into the interior of the heating chamber, leaving only a small space between its outer surface and the inner circle of the tubular member 78 of the heating chamber.

Figure 2:
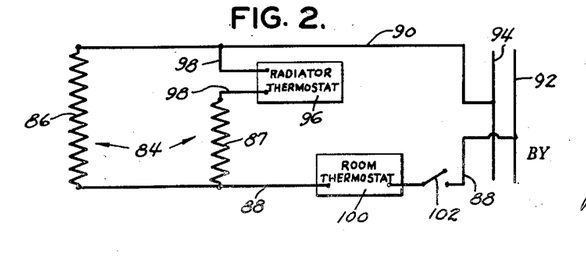
Fig. 2 is a wiring diagram illustrating an electrical control of a heating device of an apparatus according to the invention.

As best shown in Fig. 2, the electric heating device 84 comprises two heating elements or coils 86 and 87 connected in parallel relationship by wires 88 and 90 to the lines 92 and 94 of an electric source. A "radiator thermostat" 96 mounted in the lower part of the apparatus on the member 26 of the boiler 74 as shown in Fig. 1 is electrically connected to the heating element 87 and the wire 90 by wires 98 as shown in Fig. 2. A "room thermostat" 100 which may be arranged at any suitable place of the room to be heated is arranged in the wire 88 in series with a switch 102 as shown in Fig. 2.

All joints of the radiator-boiler unit 20—74 are made air-tight, so that the unit is sealed against escape of fluid.

As will be readily understood from above, the hollow sections 22 of the radiator 20 communicate with each other at their lower ends and at their upper ends. Furthermore, the lower portion of the radiator 20 communicates with the inlet of the heating chamber 76, 78, 80 and the outlet of said heating chamber communicates with the conduit 56 at the right-hand end of the latter. Said conduit 56, in turn, communicates with the various sections 22 of the radiator 20 through the apertures 64.

Prior to the start of an operation of the radiator-boiler unit 20—74, said unit is partly filled with a liquid, for example water, in such a manner that the level of said liquid in each section 22 of the radiator 20 is below the apertures 64 of the conduit 56. In the embodiment shown in Fig. 1, the level of the water in each section is below the passage 25, but yet high enough that the liquid may cover the heating device 84 of the boiler 74. If desired, the portion 78 of the boiler chamber may be made of glass so as to permit an easy observation of the water level in the unit.

Preferably, the hollow sections 22 of the radiator 20 are shaped in such a way that the cross-section of the water columns contained therein is rather small.

If desired, the radiator-boiler unit may be partly filled in the factory with water in the manner outlined above and may be shipped as a unit ready for use to the customer.

When the radiator-boiler unit 20—74 is to be used for the heating of a room, the electric heating device 84 is connected to the lines 92, 94 of an electric source and the switch 102 is closed. Thus, both heating elements 86, 87 of the heating device 84 are supplied with current, as both, the room thermostat 100 and the radiator thermostat 96 permit the flow of current.

Figure 3:
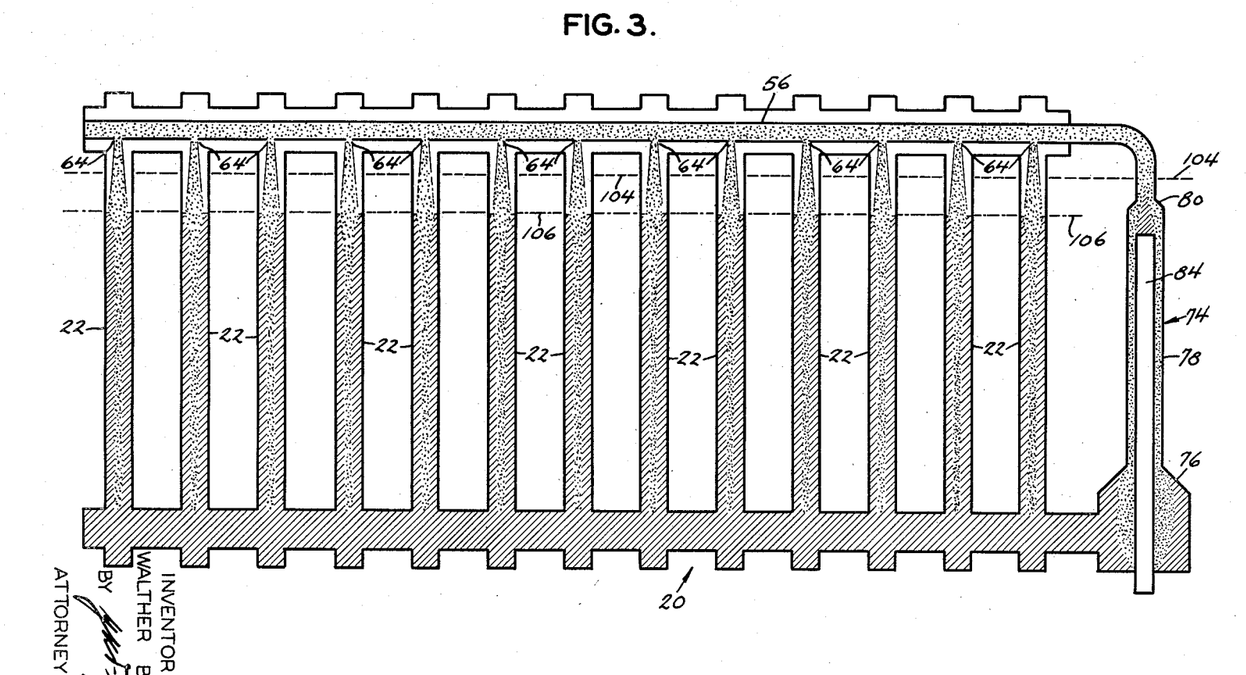
Fig. 3 is a diagrammatical view illustrating the heating apparatus shown in Fig. 1 in operation.

Before the heating device 84 becomes effective, water in the radiator sections 22 and in the boiler 74 is at the level shown in Fig. 1 and indicated in Fig. 3 by the line 104. As soon as the heating device 84 becomes effective, the water in the chamber 76, 78 of the boiler 74 is heated. The heating of the water in said chamber takes place at a rather fast rate, inasmuch as the space between the heating element 84 and the member 78 of the heating chamber is rather small. A mixture of water and steam, which is called wet steam and may comprise mostly water, rises in the chamber 78 of the boiler and flows through the outlet of said chamber into the conduit 56, as indicated by dots in Fig. 3. The wet steam is ejected under pressure through the apertures 64 of the conduit 56 acting as nozzles and through the air contained in the upper portion of the radiator 20 into the cool water columns in the hollow sections 22, said cool water columns being indicated by hatching in Fig. 3. The force of the wet steam ejected through the apertures 64 and the increasing pressure of the air expanding under the action of heat transmitted from the conduit 56 and the wet steam jets escaping therefrom through the apertures 64 causes cool water to flow from the lower portions of the sections 22 into the heating chamber 76, 78 of the boiler 74, so that the water level in sections 22 is lowered to a certain degree. The cool water entering the chamber 76, 78 of the boiler 74 is immediately heated in said chamber by the heating element 84. The mixture of water and steam caused by the heating of the water in the chamber 76, 78 rises through the outlet of said chamber into the conduit 56 and is ejected in the form of jets through the aperture 64 and through the air above the water level in the sections 22 into the water columns contained therein. Thus, the fluid circulates in the system and after a period of operation the level of the water in the columns 22 reaches a certain low point, for example at the level of the line 106.

Wet steam ejected into the water columns in the sections 22 is condensed therein and heat is transmitted through the walls of the sections 22 into the room to be heated.

The fluid escaping from the conduit 56 through the apertures 64 into the sections finds little resistance in the air above the water level.

The heating system according to the invention permits a high degree of circulation contributing to a high efficiency of the system.

If desired, the cross section of the apertures 64 may be slightly increased from the end of the conduit 56 connected to the boiler 74 towards its closed end remote from the boiler so as to obtain substantially equal flow of fluid through the apertures 64 in all sections of the radiator.

As soon as the temperature of the water in the radiator reaches a predetermined degree, the radiator thermostat 96 (see Figs. 1 and 2) switches off automatically the heating element 87 of the heating device 84, so that from now on the water in the boiler 74 is heated merely by the heating element 86 of the heating device 84. The heat generated by said heating element 86 is sufficient to bring the temperature of the water in the radiator 20 to such a degree and maintain same at said degree as is required for a proper heating of the room. Said temperature of the water is higher than the temperature at which the radiator thermostat 96 switched off the heating element 87.

When the temperature in the room reaches a predetermined degree, the room thermostat 100 set for such a degree of temperature shuts off automatically the heating device 84. As soon as the temperature of the room reaches a certain low level, the room thermostat automatically connects the heating element 84 with the supply of current and if, at that time, the temperature of the water in the radiator 20 is still higher than the temperature for which the radiator thermostat 96 is set, only the heating element 86 will be rendered active. If, however, at this time, the temperature of the water in the radiator 20 should be below the degree for which the radiator thermostat is set, both heating elements 87 and 86 will be rendered effective until such time that the temperature of the water in the radiator 20 reaches a degree at which the radiator thermostat switches off the heating element 87, so that from now on again the heating element 86 only is rendered effective.

The use of said additional heating element 87 to be shut off by the radiator thermostat 96 when the water in the radiator 20 reaches a certain temperature permits a fast starting operation of the heating apparatus and permits the reduction of the use of current to a minimum, when the operating condition of the heating apparatus is reached.

When the heating apparatus is switched off for a period of time by opening the switch 102, the fluid in the heating apparatus will cool off, the pressure in the apparatus will return to the value at the beginning of the operation and the level of the water will rise from the line 106 to the line 104 shown in Fig. 3.

As soon as the room shall be heated again, the apparatus is ready for use. It is merely necessary to switch on the heating device 84.

According to the invention, the heating apparatus is only partly filled with water so as to obtain an ejection of fluid from the conduit 56 through space. The parts of the apparatus may be made of a material light in weight. Thus, especially in view of the rather low amount of water needed for the operation of the apparatus, the apparatus even if filled with water is of comparatively light weight and may be readily transported in filled condition from one place to another.

Furthermore, if desired, the space inside of the apparatus above the level of the water may be subject to pressure when the apparatus is in cold condition, so that the operation starts with an initial internal pressure. On the other hand, if so desired, the space above the water level in the apparatus may contain a vacuum when the apparatus is in cold condition.

If desired, the efficiency of the heating system may be increased by arranging nozzles of a suitable shape on the conduit 56 through which the fluid flows from the interior of the conduit into the sections 22 of the radiator.

Figures 4, 5, 6, 7:
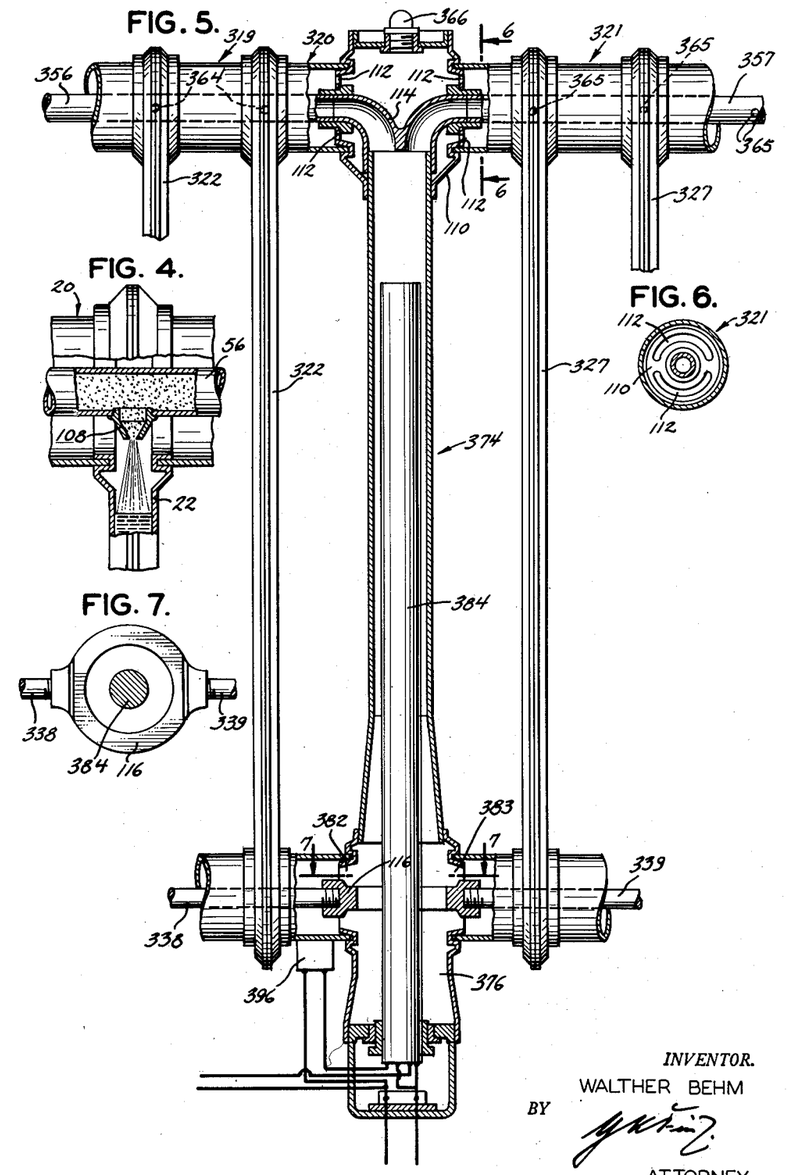
Fig. 4 is a fragmentary elevational view partly in section, of a modified detail of a heating apparatus according to the invention.
Fig. 5 is a fragmentary side elevational view, partly in section, illustrating a different embodiment of a heating apparatus according to the invention.
Fig. 6 is a vertical sectional view taken on line 6—6 of Fig. 5.
Fig. 7 is a horizontal sectional view taken on line 7—7 of Fig. 5.

According to Fig. 4, for example, a nozzle 108 is screwed into a threaded bore of the conduit 56 extending through the upper portion of the radiator 20. The fluid passes from the interior of the conduit 56 through the nozzle 108 into the section 22. According to Fig. 4, only one nozzle is arranged on the conduit 56 in a section 22, but, of course, if so desired, several nozzles could be arranged on the conduit 56 in a section of the radiator.

While, according to the embodiment shown in Fig. 1, the boiler 74 is arranged at one end of the radiator 20, according to the embodiment shown in Fig. 5, the boiler 374 is arranged between sections 322 and 327 of the radiator 320. In fact, the radiator 320 has two parts 319 and 321, each of said parts having a plurality of hollow sections 322 and 327 respectively connected with each other in each part at the bottom and the top. A conduit 356 having apertures 364 in each section extends through the upper portion of the part 319 of the radiator 320. At the left-hand end (not shown) said conduit 356 is closed in a similar manner to the conduit 56 of the radiator 20 shown in Fig. 1. Likewise, according to Fig. 5, a conduit 357 having apertures 365 in each section extends through the upper portion of the part 321 of the radiator 320, the right-hand end (not shown) of said conduit 357 being closed.

The left-hand end of the upper portion of the part 321 of the radiator 320 is engaged with grooves of a member 110 secured to the tubular chamber 378 of the boiler 374. The right-hand end of the upper portion of the part 319 of the radiator 320, likewise, is engaged with grooves of the member 110. The member 110 has passages 112 (see Figs. 5 and 6) so that the upper portions of the parts 319 and 321 of the radiator 320 communicate with each other when the radiator is assembled. A T-piece 114 secured to the outlet of the chamber 378 connects said chamber 378 with the conduit 356 and the conduit 357.

366 indicates a safety valve mounted in an opening of a cover of the member 110.

The lower vessel 376 of the heating chamber of the boiler 374 is engaged with the right-hand end of the lower portion of the part 319 of the radiator 320 and with the left-hand end of the lower portion of the part 321 of the radiator 320. The lower portions of said parts 319 and 321 communicate with the inlet of the heating chamber 376, 378 through openings 382 and 383 of the vessel 376.

The lower portions of the sections 322 and 327 and the spacers arranged between said sections are held together by bracing rods 338 and 339, the inner ends of which are threaded into threaded bores of a ring 116 (see Figs. 5 and 7) arranged in the vessel 376. The outer ends (not shown) of the bracing rods 338 and 339 are engaged with tightening nuts of the type of the nut 40 shown in Fig. 1.

An electric heating device 384 is arranged in the heating chamber 376, 378 of the boiler 374.

396 indicates a radiator thermostat mounted on the radiator for shutting off one of the heating elements of the heating device 384 when the water in the apparatus reaches a predetermined temperature.

The radiator-boiler unit 320—374 shown in Fig. 5 operates in the same manner as the radiator-boiler unit described above in connection with Fig. 1. The mixture of water and steam flows from the heating chamber 378 into the conduit 356 and into the conduit 357 and thence through the apertures of said conduits into the sections 322 and 327 of the radiator. The cool liquid flows from the lower portion of the sections 322 and 327 into the chambers 376, 378 of the boiler 374.

Figures 8, 12:
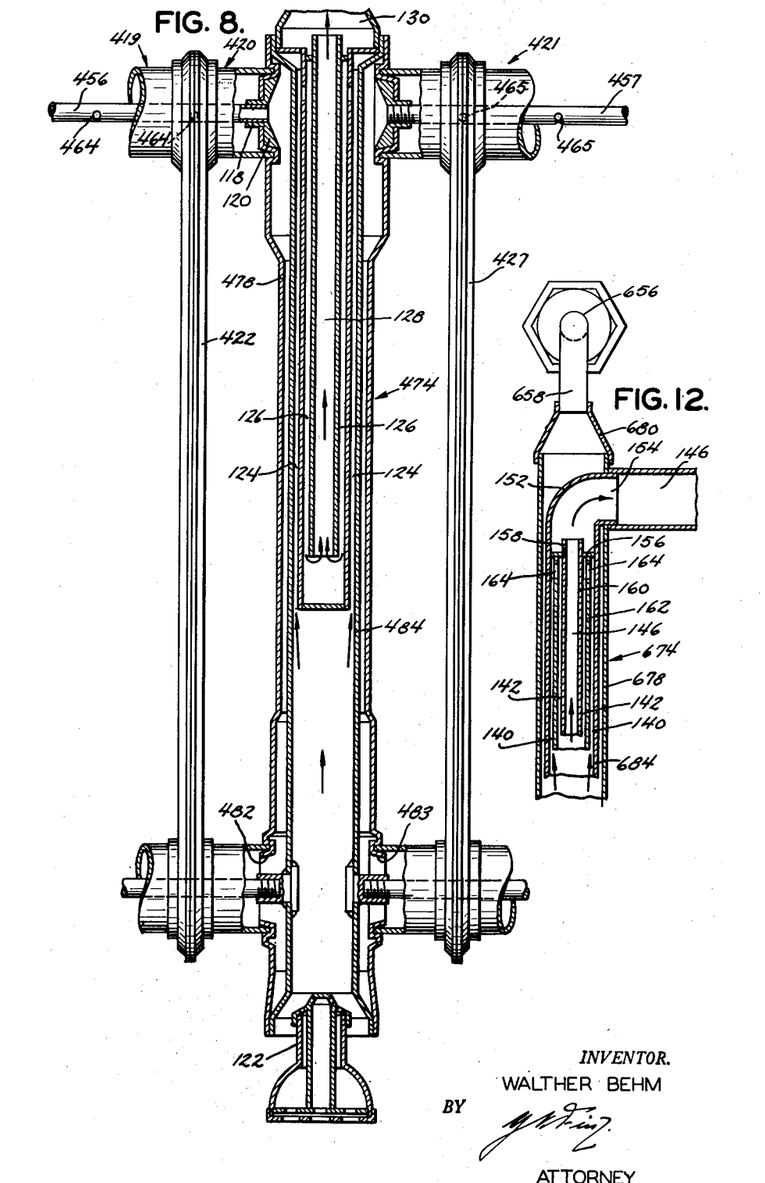

The embodiment of a radiator-boiler unit 420—474 shown in Fig. 8 corresponds to the embodiment of a radiator-boiler unit shown in Fig. 5 in that respect that the radiator comprises two parts 419 and 421 and that the boiler 474 is arranged between sections 422 and 427 of the radiator.

However, the right-hand end of the upper portion of the part 419 of the radiator 420 is engaged with the upper end of a widened portion of the chamber 478 of the boiler 474 which is closed with the exception of a center bore for receiving the hub 118 of a member 120 rigidly connected to the upper portion of the chamber 478 and arranged for receiving the screw-threaded end of the conduit 456. Likewise, the left-hand end of the upper portion of the part 421 is engaged with the closed upper portion of the chamber 478 having merely a center bore for the connection of the conduit 457. The left-hand end (not shown) of the conduit 456 having apertures 464 in each section of the part 419 of the radiator 420 and the right-hand end (not shown) of the conduit 457 having apertures 465 in each section of the part 421 of the radiator 420 are closed.

The lower end portions of the hollow sections 422 of the part 419 of the radiator 420 communicate with the chamber 478 of the boiler 474 through an inlet opening 482 of the latter. The lower end portions of the hollow sections 427 of the part 421 of the radiator 420 communicate with the chamber 478 of the boiler 474 through an inlet opening 483 of the latter.

The outlet of the chamber 478 communicates with the conduits 456 and 457. It will be noted that in the embodiment of Fig. 8, contrary to the embodiment shown in Fig. 5, there are no passages similar to the passages 112 of said Fig. 5 which cause a communication of the upper portions of the parts 419 and 421 of the radiator 420 with each other. Therefore, the parts 419 and 421 of the apparatus shown in Fig. 8 may be considered as two separate radiators to the lower portions of which and to the conduits of which a single boiler 474 is connected, which, however, do not directly communicate with each other at their upper portions. Preferably, each part 419 and 421 is provided with an opening to fill in the water and a safety valve.

The heating device 484 of the boiler 474 of the embodiment shown in Fig. 8 is constructed for operation by a gaseous or liquid fuel supplied to the burner 122 in any suitable manner. The supply of the fuel may be automatically controlled by a radiator thermostat (not shown) responsive to the temperature of the water in the heating apparatus and by a room thermostat (not shown) responsive to the temperature of the room to be heated by the apparatus. The heating gases generated in the heating device flow through flues 124, 126 and 128 as indicated by arrows and may escape through a chimney 130 attached to the boiler 474.

The operation of the apparatus shown in Fig. 8 which is also only partly filled with water, corresponds to the operation of the apparatus shown in Fig. 1.

Figure 9:
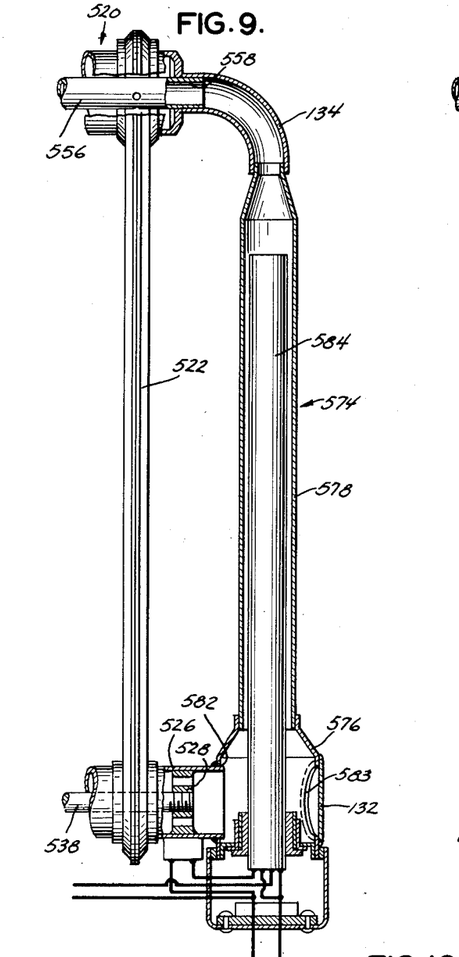

According to the embodiment shown in Fig. 9, the boiler 574 equipped with an electrical heating device 584 is arranged at the right-hand end of the radiator 520. The construction of the radiator 520 substantially corresponds to the construction of the radiator 20 of the embodiment shown in Fig. 1. However, the conduit 556 has only a short straight end 558 projecting from the upper portion of the radiator 520.

The vessel 576 of the heating chamber 576, 578 of the boiler 574 has two openings 582 and 583, the latter being closed by a cover plate 132. The opening 582 of the vessel 576 is rigidly engaged with the member 526 carrying the socket 528 for the bracing rod 538.

The upper end or outlet of the chamber 574 is tapered. Said outlet of the chamber 578 is connected with the projecting end 558 of the conduit 556 by an elbow 134.

The construction of the device shown in Fig. 9 has the advantage that the radiators 520 may be manufactured as separate parts with various numbers of sections 522, and that, likewise, the boilers 574 may be made as separate parts and may be attached to one or more radiators having a certain number of sections as may be required.

Figure 10:
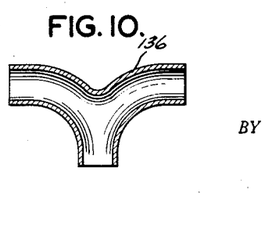

If the boiler 574 is to be attached to two radiators 520, the cover plate 132 is replaced by an annular member corresponding to the annular member 526, and the elbow 134 is replaced by a T-piece 136 as shown in Fig. 10.

Figure 11:
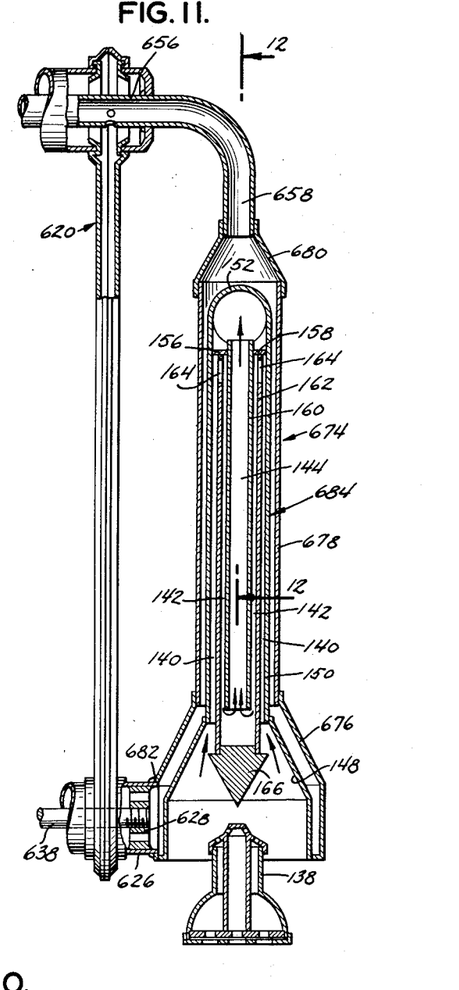

According to the embodiment of a heating apparatus shown in Figs. 11 and 12, a boiler 674 provided with a heating device 684 constructed for operation by a gaseous or liquid fuel is arranged at the right-hand end of a radiator 620 of a construction as shown in Fig. 1. The vessel 676 of the heating chamber 676, 678, 680 is connected at its inlet opening 682 with the annular member 626 carrying the socket 628 for the bracing rod 638. The tapered outlet 680 of said heating chamber is connected to the downwardly extending end 658 of the conduit 656 of the radiator 620.

The heating device 684 of the boiler 674 comprises a burner 138 projecting into the lower portion of a funnel-shaped chamber 148. The upper end of said funnel-shaped chamber 148 is connected with the lower end of a tubular member 150, the upper end 152 of which is bent and has an outlet 154 for connection with a chimney 146 aranged at a right angle to the longitudinal axis of the boiler 674. Below the bent end 152 the tubular member 150 is closed by a plate 156 having a center bore 158 receiving the upper end of an inner tube 160. The upper end of an intermediate tube 162 having a series of holes 164 adjacent said upper end and surrounding the tube 160 is attached to the plate 156. The lower end of said intermediate tube 162 projecting beyond the lower end of the inner tube 160 is closed by a body 166 of heat-conducting material and of tapered shape, the apex of which is opposite the center of the burner 138. Thus, a first flue 140 is formed between the tubular member 150 and the intermediate tube 162, a second flue 142 is formed between the intermediate tube 162 and the inner tube 160, and a third flue 144 is formed by the bore of the inner tube 160.

The heated gases produced by the burner 138 at first contacting the body 166 and transmitting some heat into said body pass upwardly through the flue 140. At the upper end of said flue 140 the heated gases pass through the holes 164 and enter the flue 142 wherein they are returned downwardly towards the heated conical body 166. Said body 166 transmits some heat to the gases which enter the flue 144 in upward direction and finally escape through the chimney 146. The flow of the gases is indicated by arrows.

Above-described arrangement of flues for the heating gases, by means of which the gases are first directed upwardly, then downwardly and then again upwardly and the additional heating of the somewhat cooled-off gases by the heated conical body 166 results in a great efficiency of the heating device.

Of course, the operation of the burner 138 of the heating device 684 may be controlled by a radiator thermostat (not shown) and a room thermostat (not shown).

I have described preferred embodiments of my invention, but it is understood that this disclosure is for the purpose of illustration and that various omissions or changes in shape, proportion and arrangements of parts as well as the substitution of equivalent elements for those herein shown and described may be made without departing from the spirit and scope of the invention as set forth in the appended claims.

For example, instead of having the boiler directly attached to the radiator as shown in the drawings, the boiler could be arranged at a place remote from the location of the radiator and could be connected to the radiator by pipes. Likewise, a boiler could be connected by pipes with a plurality of radiators.

What I claim is:

1. A heating system comprising: a boiler having a chamber with an inlet and an outlet, a conduit communicating with the outlet of said chamber, at least one hollow heating body, and at least one nozzle having an inlet and an outlet, the inlet of said nozzle communicating with said conduit, the outlet of said nozzle communicating with the upper portion of said hollow heating body, the lower portion of said hollow heating body communicating with said inlet of said chamber, and said system being only partly filled with a liquid in such a manner that the level of said liquid in said hollow heating body is below the outlet of said nozzle.

2. A heating system comprising: a boiler having a chamber with an inlet and an outlet, a conduit communicating with the outlet of said chamber, at least one hollow heating body, said conduit extending into the upper portion of said hollow heating body, and at least one nozzle having an inlet and an outlet, the inlet of said nozzle communicating with said conduit, the outlet of said nozzle communicating with the upper portion of said hollow heating body, the lower portion of said hollow heating body communicating with said inlet of said chamber, and said system being only partly filled with a liquid in such a manner that the level of said liquid in said hollow heating body is below the outlet of said nozzle.

3. A heating apparatus comprising: a boiler including a chamber and a heating device associated with said chamber, said chamber having an inlet and an outlet, at least one radiator having a plurality of upright hollow sections, a series of passages connecting the upper portions of said sections with each other whereby the interiors thereof are in communication, the lower portions of said sections communicating with each other, and a conduit extending within the upper portion of said radiator through said passages in a substantially horizontal direction, one end of said conduit communicating with the outlet of said chamber, the other end of said conduit being closed, said conduit having a cross-section smaller than the cross-section of said passages thus forming a space between its outside and said passages, said conduit having at least one aperture in each section of said radiator, said aperture having a small cross-section so as to be capable of producing a jet in operation, and the lower portion of said radiator communicating with said inlet of said chamber.

4. A heating apparatus comprising: a boiler including a chamber and a heating device associated with said chamber, said chamber having an inlet and an outlet, at least one radiator having a plurality of upright hollow sections, a series of passages connecting the upper portions of said sections with each other whereby the interiors thereof are in communication, the lower portions of said sections communicating with each other, a conduit extending within the upper portion of said radiator through said passages in a substantially horizontal direction, one end of said conduit communicating with the outlet of said chamber, said conduit having a cross-section smaller than the cross-section of said passages thus forming a space between its outside and said passages, the other end of said conduit being closed, and at least one nozzle in each section, each nozzle having an inlet and an outlet, the inlet of each nozzle communicating with the interior of said conduit, the outlet of each nozzle communicating with the interior of a section, and the lower portion of said radiator communicating with said inlet of said chamber.

5. A heating apparatus comprising: a boiler including a chamber and a heating device associated with said chamber, said chamber having an inlet and an outlet, at least one radiator having a plurality of upright hollow sections, a series of passages connecting the upper portions of said sections with each other whereby the interiors thereof are in communication, the lower portions of said sections communicating with each other, and a conduit extending within the upper portion of said radiator through said passages in a substantially horizontal direction, one end of said conduit communicating with the outlet of said chamber, the other end of said conduit being closed, said conduit having a cross-section smaller than the cross-section of said passages thus forming a space between its outside and said passages, said conduit having at least one aperture in each section of said radiator, said aperture having a small cross-section so as to be capable of producing a jet in operation, the lower portion of said radiator communicating with said inlet of said chamber, and said boiler being attached to said radiator.

6. In a heating apparatus as claimed in claim 5, said boiler including an electric heating device.

7. In a heating apparatus as claimed in claim 5, said boiler including a heating device constructed for operation by a gaseous fuel.

8. In a heating apparatus as claimed in claim 5, said boiler including a heating device constructed for operation by a liquid fuel.

9. A heating apparatus comprising: a boiler including a chamber and a heating device associated with said chamber, said chamber having an inlet and an outlet, at least one radiator having a plurality of upright hollow sections, a series of passages connecting the upper portions of said sections with each other whereby the interiors thereof are in communication, the lower portions of said sections communicating with each other, and a conduit extending within the upper portion of said radiator through said passages in a substantially horizontal direction, one end of said conduit communicating with the outlet of said chamber, the other end of said conduit being closed, said conduit having a cross-section smaller than the cross-section of said passages thus forming a space between its outside and said passages, said conduit having at least one aperture in each section of said radiator, said aperture having a small cross-section so as to be capable of producing a jet in operation, the lower portion of said radiator communicating with said inlet of said chamber, said boiler being attached to said radiator, and said apparatus being partly filled with a liquid in such a manner that the upper portion of said radiator containing said conduit is free from liquid.

10. A heating apparatus comprising: a boiler including a chamber and a heating device extending into said chamber, said chamber having an inlet and an outlet, at least one radiator having a plurality of upright hollow sections, a series of passages connecting the upper portions of said sections with each other whereby the interiors thereof are in communication, the lower portions of said sections communicating with each other, and a conduit extending within the upper portion of said radiator through said passages in a substantially horizontal direction, one end of said conduit communicating with the outlet of said chamber, the other end of said conduit being closed, said conduit having a cross-section smaller than the cross-section of said passages thus forming a space between its outside and said passages, said conduit having at least one aperture in each section of said radiator, said aperture having a small cross-section so as to be capable of producing a jet in operation, the lower portion of said radiator communicating with said inlet of said chamber, said boiler being attached to said radiator, and said apparatus being partly filled with a liquid in such a manner that the upper portion of said radiator containing said conduit is free from liquid and the level of said liquid in said chamber is above the upper end of said heating device.

11. A heating apparatus comprising: a boiler including a chamber and a heating device associated with said chamber, said chamber having an inlet and an outlet, a radiator having two parts, each part of said radiator having a plurality of hollow sections, the upper portions of said sections of each part communicating with each other, the lower portions of said sections of each part communicating with each other, a first conduit extending within the upper portion of one of said parts of said radiator and communicating with the outlet of said chamber, and a second conduit extending within the upper portion of the other part of said radiator and communicating with the outlet of said chamber, each of said conduits having at least one aperture in each section of said radiator, the lower portion of each part of the radiator communicating with said inlet of said chamber, and said boiler being attached to said radiator.

12. A heating apparatus comprising: a boiler including a chamber and a heating device associated with said chamber, said chamber having an inlet and an outlet, a radiator having two parts, each part of said radiator having a plurality of hollow sections, the upper portions of said sections of each part communicating with each other and with the upper portions of the sections of the other part, the lower portions of said sections of each part communicating with each other, a first conduit extending within the upper portion of one of said parts of said radiator and communicating with the outlet of said chamber, and a second conduit extending within the upper portion of the other part of said radiator and communicating with the outlet of said chamber, each of said conduits having at least one aperture in each section of said radiator, the lower portion of each part of the radiator communicating with said inlet of said chamber, and said boiler being attached to said radiator.

13. A radiator comprising: a plurality of upright hollow sections communicating with each other at their lower portions, a series of passages connecting the upper portions of said sections with each other whereby the interiors thereof are in communication, the lower portion of said radiator having an opening for connection with the inlet of a heating chamber of a boiler, and a conduit extending within the upper portion of said radiator through said passages in a substantially horizontal direction, said conduit having a cross-section smaller than the cross section of said passages thus forming a space between its outside and said passages, said conduit having an opening for connection with the outlet of the heating chamber of the boiler and having at least one aperture in each section of said radiator, said aperture having a small cross-section so as to be capable of producing a jet in operation.

14. A radiator comprising: a plurality of upright hollow sections communicating with each other at their lower portions, a series of passages connecting the upper portions of said sections with each other whereby the interiors thereof are in communication, the lower portion of said radiator having an opening for connection with the inlet of a heating chamber of a boiler, and a conduit extending within the upper portion of said radiator through said passages in a substantially horizontal direction, said conduit having a cross-section smaller than the cross section of said passages thus forming a space between its outside and said passages, one end of said conduit having an opening for connection with the outlet of the heating chamber of the boiler, the other end of said conduit being closed, and said conduit having at least one aperture in each section of said radiator, said aperture having a small cross-section so as to be capable of producing a jet in operation.

15. A radiator comprising: a plurality of upright hollow sections communicating with each other at their lower portions, a series of passages connecting the upper portions of said sections with each other whereby the interiors thereof are in communication, the lower portion of said radiator having an opening for connection with the inlet of a heating chamber of a boiler, a conduit extending within the upper portion of said radiator through said passages in a substantially horizontal direction, said conduit having a cross-section smaller than the cross section of said passages thus forming a space between its outside and said passages, said conduit having an opening for connection with the outlet of the heating chamber of the boiler, and at least one nozzle in each section, each nozzle having an inlet and an outlet, the inlet of each nozzle communicating with the interior of said conduit, and the outlet of each nozzle communicating with the interior of a section.

16. An electrical control system for a heating apparatus including an electrical heating device and a radiator containing a liquid, said electrical control system comprising an electrical circuit including a switch, a first thermostat responsive to the temperature of the room and a first heating element of the heating device and a second thermostat responsive to the temperature of the liquid and a second heating element of the heating device in series connection, said second thermostat and said second heating element being connected in parallel to said first heating element.

WALTHER BEHM.

REFERENCES CITED

The following references are of record in the file of this patent:

UNITED STATES PATENTS

| Number | Name | Date |
|---|---|---|
| 722,286 | Cripe | Mar. 10, 1903 |
| 725,554 | Glaser et al. | Apr. 14, 1903 |
| 1,064,849 | Monnot | June 17, 1913 |
| 1,580,651 | Daily | Apr. 13, 1926 |
| 1,629,722 | Michaud | May 24, 1927 |
| 1,681,725 | Donnelly | Aug. 21, 1928 |
| 1,738,100 | Goshorn | Dec. 3, 1929 |
| 1,749,909 | Dyar | Mar. 11, 1930 |
| 1,788,515 | Gannon | Jan. 13, 1931 |
| 1,852,252 | McIntosh | Apr. 5, 1932 |
| 1,874,174 | Donnelly | Aug. 30, 1932 |
| 2,034,172 | Bieber | Mar. 17, 1936 |
| 2,271,120 | Grant | Jan. 27, 1942 |

FOREIGN PATENTS

| Number | Country | Date |
|---|---|---|
| 313,163 | Italy | Dec. 16, 1933 |